US012568108B2

(12) United States Patent
Maor et al.

(10) Patent No.: US 12,568,108 B2
(45) Date of Patent: Mar. 3, 2026

(54) RISK FACTORS FOR AN ORGANIZATION NETWORK

(71) Applicant: Proofpoint, Inc., Sunnyvale, CA (US)

(72) Inventors: Bar Maor, Ramat Gan (IL); Hila Rachel Chen, Herzliya (IL)

(73) Assignee: PROOFPOINT, INC., Sunnyvale, CA (US)

( * ) Notice: Subject to any disclaimer, the term of this patent is extended or adjusted under 35 U.S.C. 154(b) by 97 days.

(21) Appl. No.: 18/412,652

(22) Filed: Jan. 15, 2024

(65) Prior Publication Data

US 2025/0233881 A1 Jul. 17, 2025

(51) Int. Cl.
H04L 9/40 (2022.01)
H04L 43/00 (2022.01)

(52) U.S. Cl.
CPC .......... H04L 63/1433 (2013.01); H04L 43/14 (2013.01); H04L 63/1408 (2013.01)

(58) Field of Classification Search
CPC .. H04L 63/1433; H04L 63/1408; H04L 43/14
See application file for complete search history.

(56) References Cited

U.S. PATENT DOCUMENTS

| | | | | |
|---|---|---|---|---|
| 9,807,094 | B1* | 10/2017 | Liu ........................ | H04L 63/102 |
| 11,481,709 | B1* | 10/2022 | Liao ................... | G06Q 10/0635 |
| 2014/0250006 | A1* | 9/2014 | Makhotin ............ | G06Q 20/326 |
| | | | | 705/41 |
| 2017/0332238 | A1* | 11/2017 | Bansal ................. | H04L 67/125 |
| 2018/0295518 | A1* | 10/2018 | Alloche ............... | H04L 9/3268 |
| 2022/0141239 | A1* | 5/2022 | Zaman ................... | G06F 21/71 |
| | | | | 726/23 |
| 2023/0259647 | A1* | 8/2023 | Yip ........................ | H04L 63/102 |
| | | | | 726/28 |
| 2024/0195819 | A1* | 6/2024 | Grajek ............... | H04L 63/1416 |
| 2024/0348630 | A1* | 10/2024 | McQueen ........... | H04L 63/1416 |
| 2024/0419787 | A1* | 12/2024 | Desai ...................... | H04L 63/20 |

* cited by examiner

*Primary Examiner* — Azizul Choudhury
(74) *Attorney, Agent, or Firm* — Soquel Group I.P Ltd

(57) ABSTRACT

A method for determining risks associated with an identity in an organization network, including scanning an active directory for a network including a plurality of identities, to extract a plurality of attributes of the identities and their corresponding values. analyzing the extracted attribute values for an identity in the network to identify one or more risks associated with that identity, which an attacker can exploit, assigning a score to each risk identified by said analyzing, and further assigning a score to the identity based on the scores of the one or more risks associated with the identity.

20 Claims, 4 Drawing Sheets

RISK FACTORS FOR AN ORGANIZATION NETWORK

TECHNICAL FIELD OF THE INVENTION

The present invention relates to organization network security, specifically to identifying risks in a network configuration.

BACKGROUND OF THE INVENTION

Due in part to their complexity, organization networks are often misconfigured, or configured in accordance with bad practice, which makes identities, domains and trusts vulnerable to takeover by attackers, and susceptible to malicious use.

SUMMARY OF THE INVENTION

A method for determining security risks in an organization network, including scanning an active directory for a network including a plurality of identities, to extract a plurality of attributes of the identities and their corresponding values, analyzing the extracted attribute values for an identity in the network to identify one or more risks associated with that identity, which an attacker can exploit, assigning a score to each risk identified by the analyzing; and further assigning a score to the identity based on the scores of the one or more risks associated with the identity.

BRIEF DESCRIPTION OF THE DRAWINGS

Such features and advantages of the invention will become clearer upon reading the following description, given only as a non-limiting example, and made with reference to the enclosed drawings, wherein.

Figure 1:
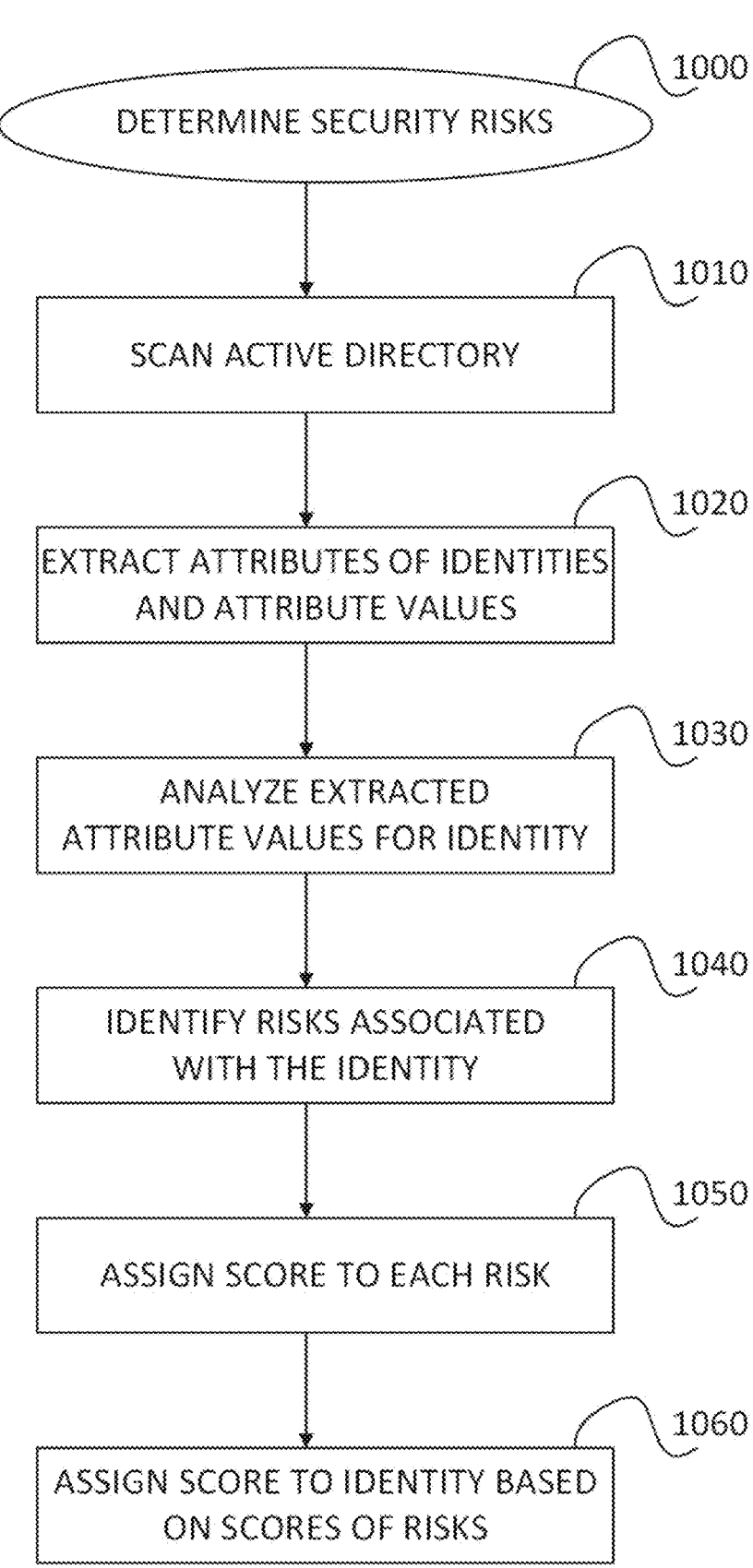
FIG. 1 is a simplified flowchart of a method for determining security risks in an organization network, according to an embodiment of the present invention.

The following definitions are employed throughout the specification.

ACTIVE DIRECTORY—Active Directory (AD) is a directory service developed by Microsoft for Windows domain networks. Windows Server operating systems include it as a set of processes and services. Originally, only centralized domain management used Active Directory. However, it ultimately became an umbrella title for various directory-based identity-related services. A domain controller is a server running the Active Directory Domain Service role. It authenticates and authorizes all users and computers in a Windows domain-type network, assigning and enforcing security policies for all computers and installing or updating software. For example, when a user logs into a computer part of a Windows domain, Active Directory checks the submitted username and password and determines whether the user is a system administrator or a non-admin user. Furthermore, it allows the management and storage of information, provides authentication and authorization mechanisms, and establishes a framework to deploy other related services. Active Directory uses Lightweight Directory Access Protocol (LDAP) versions 2 and 3, Microsoft's version of Kerberos, and DNS.

DOMAIN—A domain is an administrative grouping of multiple private computer networks or local hosts within the same infrastructure. Domains may be identified using a domain name. Domains which need to be accessible from the public Internet may be assigned a globally unique name within the Domain Name System (DNS).

IDENTITY—Identity refers to the information utilized by computer systems to represent external entities, including a person, organization, application, or device. When used to describe an individual, the identity encompasses a person's compiled information and plays a crucial role in automating access to computer-based services, verifying identity online, and enabling computers to mediate relationships between entities (https://en.wikipedia.org/).

IDENTITY ACCESS AND MANAGEMEN PLATFORM—A network manager including inter alia Microsoft Active Directory, Azure Active Directory, Amazon Web services Identity and Access Management (AWS IAM), and Okta Customer Identity Cloud.

LDAP—Light Weight Directory Access Protocol (LDAP) is an open, vendor-neutral, industry standard application protocol for accessing and maintaining distributed directory information services over an Internet Protocol (IP) network. A common use of LDAP is to provide a central place to store usernames and passwords. This allows many different applications and services to connect to an LDAP server to validate users.

PROTECTED USERS—Protected Users is An Active Directory security group that is part of a strategy to manage credential exposure within an enterprise. Members of this group automatically have non-configurable protections applied to their accounts. Membership in the Protected Users group is restrictive and proactively secure by default. The only method to modify these protections for an account is to remove the account from the security group (https://learn.microsoft.com/).

TRUST—Trusts are special attributes that grant or deny certain actions and accesses to users, groups, and security principles from two domains in a trust relationship.

DETAILED DESCRIPTION

Reference is made to FIG. 1, which is a simplified flowchart of a method 1000 for determining security risks in an organization network, according to an embodiment of the present invention. At operation 1010 an identity and access management platform for a network including a plurality of identities is scanned. The identify and access platform may be inter alia Microsoft Active Directory, Azure Active Directory, Azure Identity and Access Management, Amazon Web Services Identity and Access Management (AWS IAM), or Okta Customer Identity Cloud. At operation 1020, a plurality of attributes of the identities and their corresponding values are extracted. At operation 1030 the extracted attribute values for an identity in the network are analyzed. At operation 1040 one or more risks associated with that identity, which an attacker can exploit, are identified. At operation 1050 a score is assigned to each identified risk. At operation 1060 a score is assigned to the identity based on the scores of the one or more risks associated with the identity.

Risk Factors

A risk factor is a misconfiguration or a security bad practice that makes an identity a desired target for attackers, more vulnerable to a takeover, and susceptible to malicious use. In some cases, risk factors might indicate a malicious activity already taking place. Risk factors are grouped into broad risk categories of related identity, domain, or trust risk factors. Each risk factor is given a risk exposure score, which indicates the level of risk it poses to the organization. The score is based on analysis of information gathered from various identity providers.

Risk factors also include potential attack vectors, based on permissions and access control lists (ACLs) that an identity may have to make it vulnerable and exploitable for an attacker. For example, identities with permissions to reset users' passwords are a risk of type "identities that are able to perform account takeover". Such risk factors are derived by analyzing permissions and policies, in addition to attributes.

A risk exposure score is assigned to each risk factor and to each identity. An identity's risk exposure score is equal to the highest risk exposure score of the risk factors associated with it. In one embodiment of the present the risk exposure scores are as follows.

Critical

There is a very high probability that attackers are looking for these kinds of vulnerabilities and know how to exploit them, often without even being detected. The impact on the organization is critical, as attackers will have access to critical accounts and assets.

Examples: shadow admins over the domain or privileged domain groups.

High

Vulnerabilities that significantly increase the probability of exploits that can eventually lead to critical impact on the organization.

Examples: shadow admins with a larger distance, or privileged accounts with outdated passwords or stored credentials on multiple endpoints.

Medium

Vulnerabilities that are harder to find or that require additional measures to be taken to reach the level of control necessary for critical impact.

Examples: unmanaged local privileged accounts, wrongly used service accounts.

Low

Secondary indications of bad cyber hygiene that should be handled before they lead to more serious implications.

Examples: password issues in local privileged accounts, or mismatches in service account naming conventions.

What follows are some specific risks factors that are identified by the method of claim 1 in accordance with embodiments of the present invention.

Exemplary Risk Factors

1. AdminSDHolder Partial Protection

Every 60 min (default), the AdminSDHolder service compares the permissions on protected objects (domain admin Privileged users) in Active Directory. If the permissions are different than the default settings, it replaces the permissions on the protected object with those defined on AdminSDHolder. Therefore, an attacker who modifies the AdminSDHolder container can establish a path of shadow administration and a means to regain administrative access to Active Directory. By changing dSHeuristics value an attacker excludes administrative groups from the adminSD-Holder container.

Risk Exposure Score: High

2. Unprivileged Accounts with Permissions on AdminSD-Holder

Every 60 min (default), the AdminSDHolder service compares the permissions on protected objects (Domain Admin Privileged users) in Active Directory. If the permissions are different than the default settings, it replaces the permissions on the protected object with those defined on the AdminSDHolder. Therefore, an attacker who modifies the AdminSDHolder container can establish a path of shadow administration and a means to regain administrative access to Active Directory. By modifying the permissions on the AdminSDHolder container an attacker registers to one of the most powerful security mechanisms and any added user will have permissions on the domain's strongest users and groups.

Risk Exposure Score: High

3. Anonymous LDAP Access

Although the LDAP security model does not include mechanisms for access control, Active Directory provides access control in the form of ACLs on directory objects. By modifying the dSHeuristics attribute, unauthenticated and anonymous users perform any LDAP operation in the domain.

Risk Exposure Score: Critical

4. Disabled Trust Relationship

When a trust relationship is disabled, users from either domain cannot authenticate to each other. This leads attackers to leverage disabled trusts and move across domains.

Risk Exposure Score: Medium

5. Trust with SID Filtering Disabled

Trusts have special attributes that can grant or deny certain actions and accesses to users, groups, and security principles from both domains. SID-Filtering is a special attribute with a built-in mechanism that prevents an attacker's compromise of previous SIDs in the SID-History. If SIDFiltering is disabled, attackers use the SID history to gain privileged access.

Risk Exposure Score: Critical

6. Trust Supporting Weak Protocols

Trusts have special attributes that can grant or deny certain actions and accesses to users, groups, and security principles from both domains in the trust relationship. A trust with weak protocols is a special attribute that supports weak authentication and hashing protocols. Attackers exploit these weak protocols to compromise the domain.

Risk exposure score: High

7. Trust Supporting Kerberos Ticket Delegation

Trusts have special attributes that grant or deny certain actions and accesses to users, groups, and security principles from both domains in the trust relationship. When delegation is enabled, the Kerberos ticket TGT may be captured. This TGT grants access to any service the domain has access to. If the trusted domain is compromised, the identities on the trusting domain are highly vulnerable to full impersonation.

Risk exposure score: High

8. Trust with Windows Domain not Running Active Directory

Using a directory service application other than Active Directory to manage domains forces outdated/vulnerable authentication and encryption protocols to be used. In addition, windows domains (Pre-Win2k) that only support NTLM also surface in this risk. Establishing trust with such an entity impacts the local domain and reduces security efficiency.

Risk exposure score: Medium

9. Trust with Non-Windows Domain

Establishing trust with a non-Windows domain forces outdated/vulnerable authentication and encryption protocols to be used. This risk is relevant for both Unix-based domains and a Windows domain that is identified as a Kerberos realm. This impacts the local domain and reduce security efficiency.

Risk exposure score: Medium

10. Trust with Domain that Manages Privileged Identities

PIM is a trust with the domain responsible for managing other domains in the forest. This type of trust allows the managing domain to perform administrative actions on the trusting domain. If the PIM domain is compromised, it is used to gain absolute control over the managed domain.

Risk exposure score: Medium

11. Inactive Privileged AD User Account

Inactive user accounts often stay in the network because of weaknesses in the decommissioning process. These accounts are abused as backdoors, and when privileged, pose a highly vulnerable security risk.

Risk exposure score: Medium

12. Inactive Privileged AD User Account

Inactive computer accounts often stay in the network because of weaknesses in the decommissioning process. These accounts are abused as backdoors, and when privileged, pose a highly vulnerable security risk.

Risk exposure score: Medium

13. Inactive AD Computer Account

Inactive computer accounts often stay in the network because of weaknesses in the decommissioning process. These accounts are abused as backdoors, posing a vulnerable security risk.

Risk exposure score: No Risk

14. Inactive AD User Account

Inactive user accounts often stay in the network because of weaknesses in the decommissioning process. These accounts are abused as backdoors, posing a vulnerable security risk.

Risk exposure score: No Risk

15. AD Account with Unconstrained Delegation

When unconstrained delegation is configured, the AD account is used to impersonate any user and receive a forwardable TGT. This TGT grants access to any service the user has access to. If the AD account is compromised, any authenticated user may be impersonated by the attacker. If the impersonated user is an administrator or a domain controller (a connection can be forced by using the spooler service), the domain is compromised.

Risk exposure score: High

16. AD Privileged Account that can be Delegated

Delegated permissions are used by applications with a signed-in user. In these applications, either the user or administrator consents to the permissions it requests. A delegation of permission gives the application permission to connect to the target resource as a signed-in user. An AD account without the flag "This account is sensitive and cannot be delegated" can be potentially impersonated by an account that is authorized for delegation. Therefore, it is best practice to enforce this flag on all privileged accounts.

Risk exposure score: High

17. Kerberoastable AD Privileged User Account with SPN and Weak Password/Policy

Kerberoasting is an attack that abuses the Kerberos protocol to harvest password hashes for Active Directory accounts with servicePrincipalName (SPN) values. A user may request a ticket-granting service (TGS) for any SPN which can be encrypted using the password hash of the service account that is assigned to the requested SPN as the key. Therefore, an adversary who is able to steal TGS tickets can extract the service account's password hash and attempt an offline brute force attack to obtain the plaintext password. Having an old password, weak encryption algorithm or weak password policy in an organization increases the odds that an attacker will successfully brute force the password hash.

Risk exposure score: Critical

18. AS-REP Roastable AD Privileged User Account with Weak Password/Policy

AS-REP roasting is a form of attack on the Kerberos authentication protocol that takes advantage of a known weakness in the protocol that may be exploited during initial authentication with a Key Distribution Center (KDC). AS-REP roasting allows a malicious attacker to retrieve the password hash of any Kerberos user accounts that have the DONT_REQ_PREAUTH option enabled. Having an old password, weak encryption algorithm or weak password policy in an organization increasing the odds that an attacker will successfully brute force the password hash.

Risk exposure score: Critical

19. Kerberoastable AD Privileged User Account with SPN

Kerberoasting is an attack that abuses the Kerberos protocol to harvest password hashes for Active Directory accounts with servicePrincipalName (SPN) values. A user may request a ticket-granting service (TGS) for any SPN which can be encrypted using the password hash of the service account that is assigned to the requested SPN as the key. Therefore, an adversary who is able to steal TGS tickets may extract the service account's password hash and attempt an offline brute force attack to obtain the plaintext password. Having frequently changed passwords, strong encryption algorithm or strong password policy in an organization reduces the odds that an attacker will successfully brute force the password hash.

Risk exposure score: Critical

20. AS-REP Roastable AD Privileged User Account

AS-REP roasting is a form of attack on the Kerberos authentication protocol that takes advantage of a known weakness in the protocol that can be exploited during initial authentication with a Key Distribution Center (KDC). AS-REP roasting enables a malicious attacker to retrieve the password hash of any Kerberos user accounts that have the DONT_REQ_PREAUTH option enabled. Having frequently changed passwords, strong encryption algorithm or strong password policy in an organization reduce the odds that an attacker will successfully brute force the password hash.

Risk exposure score: Critical

21. Kerberoastable User Account with SPN and Weak Password/Policy

Kerberoasting is an attack that abuses the Kerberos protocol to harvest password hashes for Active Directory accounts with servicePrincipalName (SPN) values. A user may request a ticket-granting service (TGS) for any SPN which can be encrypted using the password hash of the service account that is assigned to the requested SPN as the key. Therefore, an adversary who is able to steal TGS tickets can extract the service account's password hash and attempt an offline brute force attack to obtain the plaintext password. Having an old password, weak encryption algorithm or weak password policy in an organization increases the odds that an attacker will successfully brute force the password hash.

Risk exposure score: Critical

22. AS-REP Roastable AD User Account

AS-REP roasting is a form of attack on the Kerberos authentication protocol that takes advantage of a known weakness in the protocol that may be exploited during initial authentication with a Key Distribution Center (KDC). AS-REP roasting enables a malicious attacker to retrieve the password hash of any Kerberos user accounts that have the DONT_REQ_PREAUTH option enabled. Having frequently changed passwords, strong encryption algorithm or strong password policy in an organization reduce the odds that an attacker will successfully brute force the password hash.

Risk exposure score: Medium

23. Kerberoastable AD User Account with SPN

Kerberoasting is an attack that abuses the Kerberos protocol to harvest password hashes for Active Directory accounts with servicePrincipalName (SPN) values. A user may request a ticket-granting service (TGS) for any SPN which can be encrypted using the password hash of the service account that is assigned to the requested SPN as the key. Therefore, an adversary who is able to steal TGS tickets can extract the service account's password hash and attempt an offline brute force attack to obtain the plaintext password. Having frequently changed passwords, strong encryption algorithm or strong password policy in an organization reduce the odds that an attacker will successfully brute force the password hash.

Risk exposure score: Low

24. AS-REP Roastable AD User Account with Weak Password/Policy

AS-REP roasting is a form of attack on the Kerberos authentication protocol that takes advantage of a known weakness in the protocol that may be exploited during initial authentication with a Key Distribution Center (KDC). AS-REP roasting enables a malicious attacker to retrieve the password hash of any Kerberos user accounts that have the DONT_REQ_PREAUTH option enabled. Having an old password, weak encryption algorithm or weak password policy in an organization increases the odds that an attacker will successfully brute force the password hash.

Risk exposure score: Low

25. Windows Hosts with Local Privileged Accounts that are not Managed by PAM or LAPS Local accounts with administrator privileges are non-personal accounts which are created automatically when installing a Windows computer. These accounts have complete control over files and services. They may have privileges which enable installation of any software on a computer, modify or disable security settings, transfer data, and create any number of new local admins. Local accounts are routinely used by IT teams to perform maintenance on workstations and servers. Even though their capabilities are restricted to the local host, they often have the same passwords throughout an organization. Using shared passwords across thousands of hosts can make local administrative accounts a soft target that attackers routinely exploit. It is highly recommended to manage these accounts with Local Administrator Password Solution or Privileged Access Management.

Risk exposure score: Medium

26. Windows Hosts with Recently Used Local Privileged Accounts

Local accounts with administrator privileges are non-personal accounts which are created automatically when installing a Windows computer. These accounts have complete control over files and services. They may have privileges which enable installation of any software on a computer, modify or disable security settings, transfer data, and create any number of new local admins. Local accounts are routinely used by IT teams to perform maintenance on workstations and servers. Even though their capabilities are restricted to the local host, they often have the same passwords throughout an organization. Using shared passwords across thousands of hosts makes local administrative accounts a soft target that attackers can routinely exploit.

Risk exposure score: Low

27. Windows Hosts with Unmanaged Local Privileged Accounts with Outdated Passwords Leaving an account's password unchanged for an extended period of time makes it easier for attackers and former employees to keep using and exploiting these accounts without detection.

Risk exposure score: Medium

28. Windows Hosts with Unmanaged Local Privileged Accounts with Recently Changed Passwords Rotating passwords is a very important practice as it reduces the ability to exploit local privileged accounts. It is highly recommended to perform this rotation as part of an organization's password and privileged account management solution. It may be suspicious if this rotation is done manually.

Risk exposure score: Medium

29. Outdated Functionality Level on an Existing Domain

Domain and forest capabilities are determined by functional levels in Active Directory Domain Services (AD DS). The functionality level determines the features of a Domain Controller (DC) based on the Windows Server Operating System (OS) it runs on. A system with outdated functionality is vulnerable to security threats.

Risk exposure score: Medium

30. AD Privileged User Accounts with Outdated Passwords

A privileged identity whose password was not changed for more than 90 days. This significantly raises the risk for account takeover and can be maliciously used without alerting the security team. These credentials may also be "found in the wild", meaning that attackers might have already used them to laterally move within a network and put critical assets at risk.

Risk exposure score: High

31. AD User Account with Password Set to Never Expire

A common misconfiguration that increases both password vulnerability and the risk of account takeover.

Risk exposure score: Medium

32. AD KRBTGT Account with Outdated Password

According to DISA STIG (Security Technical Implementation Guides) V-91779 the KRBTGT account password should be reset at least every XX (180) days. The KRBTGT account acts as a service account for the Kerberos Key Distribution Center (KDC) service. The account and password are created when a domain is created and the password is typically not changed. If the KRBTGT account is compromised, attackers create valid Kerberos Ticket Granting Tickets (TGT). The password must be changed twice to effectively remove the password history. Changing once, waiting for replication to complete and changing again reduces the risk of issues. Changing twice in rapid succession forces clients to re-authenticate (including application services) but is desired if a compromise is suspected.

Risk exposure score: Medium

33. AD Privileged User Account with Weak Password Policies

Having weak password policies makes it easier for attackers to discover a user's password. The following are considerations for a strong password policy. AD privileged accounts that do not meet these required standards will be considered at risk: Password History enforcement/Maximum and Minimum Password age/Minimum Password length/Complexity requirements/If Store passwords are using reversible encryption.

Risk exposure score: High

34. AD User Account with Weak Password Policies

Having weak password policies makes it easier for attackers to discover a user's password. The following are considerations for a strong password policy. AD privileged accounts that do not meet these required standards will be considered at risk: Password History enforcement/Maximum and Minimum Password age/Minimum Password length/Complexity requirements/If Store passwords are using reversible encryption.

Risk exposure score: Medium

35. Azure AD Privileged User Account with Outdated Password

The password of this Azure AD privileged user has not been changed for over 90 days. This significantly raises the risk of takeover and may be maliciously used without alerting the security team. These credentials could also be "found in the wild", meaning that attackers might have already used them to laterally move within an Azure AD tenant, putting critical assets at high risk.

Risk exposure score: High

36. Azure AD Non-Privileged User Account with Outdated Password

The password of this Azure AD non-privileged user has not been changed for over 90 days. This significantly raises the risk of takeover and may be maliciously used without alerting the security team. These credentials could also be "found in the wild", meaning that attackers might have already used them to laterally move within an Azure AD tenant, putting critical assets at risk.

Risk exposure score: Medium

37. Azure AD Privileged Application with Outdated Secret

The client secret of this privileged application has not been changed for over 365 days. This significantly raises the risk of takeover and may be maliciously used without alerting the security team. These credentials may also be "found in the wild", meaning that attackers may have already used them to laterally move within an Azure AD tenant, putting critical assets at high risk.

Risk exposure score: High

38. Azure AD Non-Privileged Application with Outdated Secret

The client secret of this application has not been changed for over 365 days. This significantly raises the risk of takeover and may be maliciously used without alerting the security team. These credentials may also be "found in the wild", meaning that attackers may have already used them to laterally move within an Azure AD tenant, putting critical assets at risk.

Risk exposure score: Medium

39. AD Service Account User for Interactive Login

Interactive login is usually performed locally, where the user either has direct physical access to the machine or through Terminal Services. Since service accounts are designed for services or applications to communicate directly with the operating system, it is highly suspicious when service account credentials are used by a human user. Such abuse may indicate that a rogue user or attacker is attempting to gain access to highly privileged roles and permissions. Another major concern is that a service account is anonymous. Service account actions may be taken anywhere on the network and cannot be associated with a specific end user. If service account credentials are available to multiple people, any of them may make any kind of configuration or manipulation in the domain without accountability.

Risk exposure score: Medium

40. Potentially Unidentified AD Service Account

Unknown and unmanaged service accounts put an organization's critical systems and resources at risk. IT teams need the ability to track where and how service accounts are used in order to prevent, detect, and suppress unauthorized usage, or even turn accounts off. In Active Directory, service accounts are usually standard user accounts that cannot be distinguished from other end-user accounts. Enforcing a naming convention is a good method to track such accounts.

Risk exposure score: Low

41. AD Privileged Account that is not Part of the "Protected Users" Group

The Protected User group is a special security group that automatically applies protections for privileged accounts. For example, Disables NTLM authentication, Reduces Kerberos ticket lifetime, Prevents password caching on workstations, Prevents any type of Kerberos delegation, and more.

Risk exposure score: Medium

42. AD Account with Unexpected Control Over Privileged AD Objects

This identity may gain full control over privileged AD identities and exploit their capabilities. This is often overlooked because they are not members of privileged Active Directory (AD) groups, but are granted permissions through direct assignment. This high privileged and low-profile identity, also known as a Shadow Admin, is a preferred identity for an attacker. The severity level of this risk factor goes down as the number of steps to full control go up. Accounts that may gain control in 1, 2-3, or over 3 steps are differentiated, and are assigned different risk exposure scores.

Risk exposure score for 1 step: Critical

Risk exposure score for 2-3 steps: High

Risk exposure score for over 3 steps: Medium

43. AD Account with Unexpected Domain Replication Privileged (DCSync)

Once access has been gained to a privileged account with domain replication rights, an attacker may then utilize replication protocols to mimic a domain controller and ask other domain controllers to replicate information. This provides the ability to replicate all data for an object, including password data, and provides the ability to "DCSync" the password data for AD users and computers. The severity level of this risk factor goes down as the number of steps to full control go up. Accounts that may gain control in 1, 2-3, or over 3 steps are differentiated, and assigned different risk exposure scores.

Risk exposure score for 1 step: Critical

Risk exposure score for 2-3 steps: High

Risk exposure score for over 3 steps: Medium

44. AD Computer Account with Unexpected Privileges

Once a computer is compromised, the attacker can use the computer's domain identity to exploit its privileges. A compromised privileged computer may also be used to establish persistency in the network by creating a service/ scheduled task that runs with SYSTEM permissions.

Risk exposure score: High

45. AD Privileged Account not Managed by PAM

AD user accounts not managed by a PAM (Privileged Access Management) tool increases the risk of attackers gaining access without detection and exploiting privileged identity accounts in an organization. With PAM, it is possible to reduce this risk by managing the access and passwords of privileged identities and constantly monitoring their sessions and activities.

Risk exposure score: High

46. Azure AD Configured with a Non-Privileged Guest User

Azure AD non-privileged Guest users are external users who are typically granted temporary access to the tenant and should be monitored carefully due to the potential security risks they pose to the tenant.

Risk exposure score: Low

47. Azure AD Configured with a Privileged Guest User

Azure AD privileged Guest users are external users who are typically granted temporary access to the tenant and should be monitored carefully due to the potentially high-security risks they pose to the tenant.

Risk exposure score: High

48. AD Privileged Account Credentials Stored on Multiple Endpoints

Employees connect to servers containing critical data, IoT, and IT management devices as part of routine business. The tools they use to connect frequently store or cache credentials to ease the connection process. Attackers with access to hosts on which these credentials are stored use them to move laterally through an organization. When privileged identity credentials are stored or cached on multiple endpoints, this increases password exposure and the likelihood the identity will be compromised.

Risk exposure score: High

In many cases a risk factor for an organization network, once identified, may be automatically mitigated by appropriately changing the network configuration via Active Directory.

Figure 2:
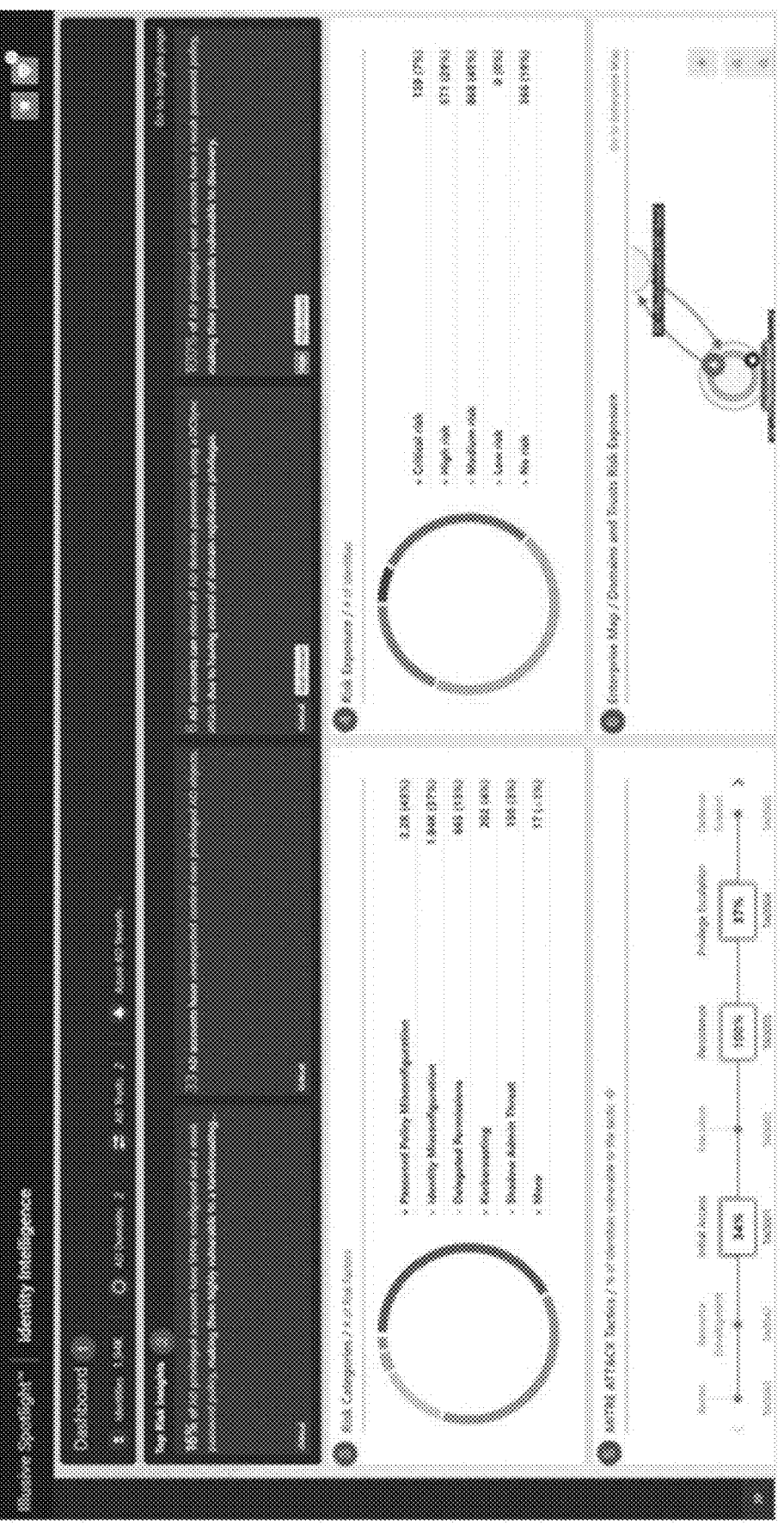
FIG. 2 is a screen shot of a dashboard for interactively displaying risk factors identified within an organization network, according to an embodiment of the present invention.

Reference is made to FIG. 2, which is a screen shot 100 of a dashboard for interactively displaying risk factors identified within an organization network, according to an embodiment of the present invention. FIG. 2 shows six panes, as follows. Pane 110 is a summary pane indicating 1,940 identities (rounded from 1944), 2 Active Directory domains, 2 Active Directory trusts, and no Azure Active Directory tenants. Pane 120 indicates top risk insights. "16% of AD privileged accounts have SPNs configured and a weak password policy, making them highly vulnerable to a Ker-beroasting . . . ". "AD accounts have unexpected control over privileged AD objects". "AD accounts can obtain all AD domain passwords using a DCSync attack due to having control of domain replication privileges". "100% of AD privileged user accounts have a weak password policy, making their passwords vulnerable to discovery". Pane 130 indicates risk categories; namely, password policy misconfiguration, identity misconfiguration, delegated permissions, Kerberoasting, shadow admin threat, and more. Pane 140 indicates a risk exposure pie chart, indicating 139 (7%) of identities have a critical risk, 571 (29%) of identities have a high risk, 868 (45%) identities have a medium risk, 0 (0%) identities have a low risk, and 366 (19%) identities have no risk. Pane 150 indicates MITRE ATT&CK tactics[1]/# of identities vulnerable to the tactic. Pane 160 includes a link to an enterprise map showing domain and trust risk exposures.

MITRE ATT&CK® is a globally-accessible knowledge base of adversary tactics and techniques based on real-world observations. The ATT&CK knowledge base is used as a foundation for the development of specific threat models and methodologies in the private sector, in government, and in the cybersecurity product and service community. Refer to attack.mitre.org.

Figure 3:
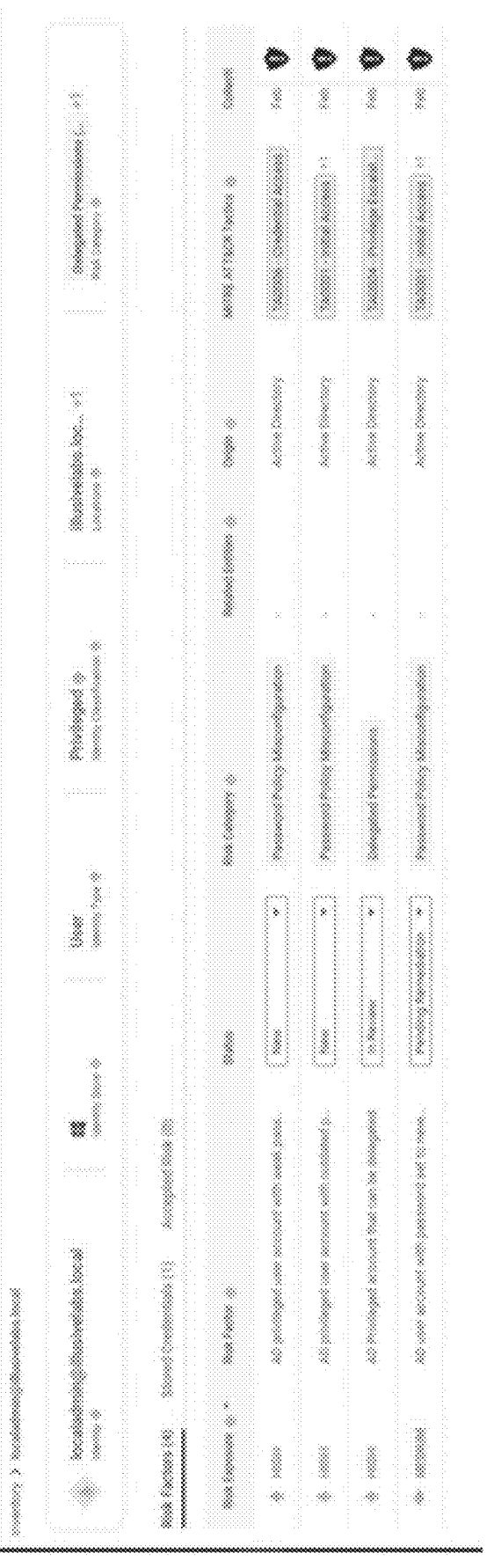
FIG. 3 is a screen shot of a drill-down to risk factors associated with a specific identity "localadmin@illusivelabs.local", according to an embodiment of the present invention.

Reference is made to FIG. 3, which is a screen shot 200 of a drill-down to risk factors associated with a specific identity "localadmin@illusivelabs.local", according to an embodiment of the present invention. Risk factors shown are as follows. "AD privileged user account with weak password", AD privileged user account with outdated password", "AD privileged account that can be delegated", "AD user account with password set to have . . . ".

Figure 4:
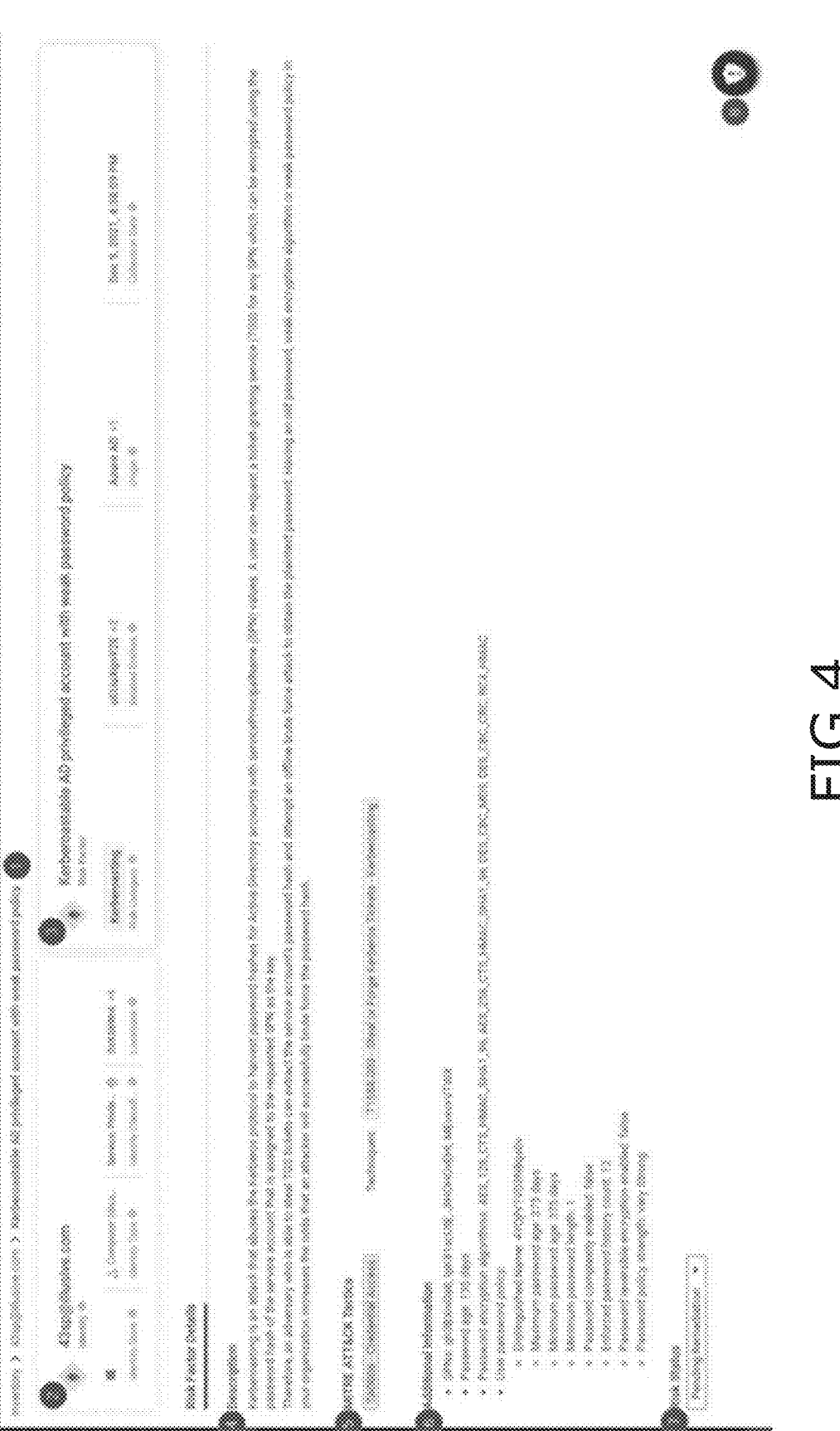
FIG. 4 is a screen shot of a drill-down to a risk factor "Kerberoastable AD privileged account with weak password policy", according to an embodiment of the present invention.

Reference is made to FIG. 4, which is a screen shot 300 of a drill-down to a risk factor "Kerberoastable AD privileged account with weak password policy", according to an embodiment of the present invention. Screen shot 300 shows the identity associated with the risk factor and details of the risk factor. Risk factor details include a description, MITRE ATT&CK tactics, additional information, and risk status.

The invention claimed is:

1. A method for determining security risks in an organization network, comprising:

scanning, according to a pre-defined schedule, a network configuration comprising a plurality of identities, to extract a plurality of attributes of the identities and their corresponding values;

analyzing the extracted attribute values for an identity in the network to identify one or more risks associated with that identity, which an attacker can exploit;

obtaining a score for each risk identified by said analyzing, from a list of pre-determined risk scores irrespective of the identity; and assigning a score to the identity based on the scores of the one or more risks associated with the identity.

2. The method of claim 1, wherein the network comprises a plurality of protected objects, and wherein said analyzing comprises comparing permissions on protected objects with their default settings.

3. The method of claim 1, wherein the network comprises a plurality of domains and trust relationships between domains, and wherein said analyzing comprises identifying a disabled trust relationship.

4. The method of claim 1, wherein the network comprises a plurality of domains and trust relationships between domains, and wherein said analyzing comprises identifying trusts with weak protocols.

5. The method of claim 1, wherein the network comprises a plurality of domains and trust relationships between domains, and wherein said analyzing comprises identifying trusts that have delegation enables.

6. The method of claim 1, wherein the network comprises a plurality of domains and trust relationships between domains, and wherein said analyzing comprises identifying trusts with a domain responsible for managing other domains.

7. The method of claim 1, wherein said analyzing comprises identifying an active directory account with unconstrained delegation.

8. The method of claim 1, wherein said analyzing comprises identifying a privileged user account with a weak password policy.

9. The method of claim 1, wherein said analyzing comprises identifying local accounts with administrator privileges.

10. The method of claim 1, wherein the network comprises a plurality of domains, and wherein said analyzing comprises identifying systems with outdated functionalities on existing domains.

11. The method of claim 1, wherein said analyzing comprises identifying privileged identities with outdated passwords.

12. The method of claim 1, wherein said analyzing comprises identifying privileged applications with outdated secrets.

13. The method of claim 1, wherein the network comprises a plurality of service accounts, and wherein said analyzing comprises identifying service accounts used for interactive logins.

14. The method of claim 1, wherein the network comprises a plurality of service accounts, and wherein said analyzing comprises identifying unmanaged service accounts.

15. The method of claim 1, wherein the network comprises a plurality of privileged objects, and wherein said analyzing comprises identifying accounts with unexpected control over privileged objects.

16. The method of claim 1, wherein the network comprises a plurality of domains, and wherein said analyzing comprises identifying accounts with unexpected domain replication privileges.

17. The method of claim 1, wherein said analyzing comprises identifying a configuration for guest users.

18. The method of claim 1, wherein said analyzing comprises identifying unsecure credential storage.

19. A method for determining security risks in an organization network, comprising:

scanning, according to a pre-defined schedule, a network configuration comprising a plurality of identities, to extract permissions of the identities;

analyzing the extracted permissions for an identity in the network to identify one or more risks associated with that identity, which an attacker can exploit;

obtaining a score for each risk identified by said analyzing, from a list of pre-determined risk scores irrespective of the identity; and assigning a score to the identity based on the scores of the one or more risks associated with the identity.

20. The method of claim 19, wherein said analyzing comprises identifying identities with permission to reset their passwords.

* * * * *